United States Patent [19]
Klatt et al.

[11] Patent Number: 5,866,247
[45] Date of Patent: Feb. 2, 1999

[54] INSULATOR MATERIAL MADE FROM RICE HUSKS FOR PRODUCING A BULK INSULATOR, METHOD FOR THE MANUFACTURE THEREOF AS WELL AS METHOD FOR INSTALLATION THEREOF

[75] Inventors: Carsten Klatt, Osterholz Scharmbeck; Frank Ziech, Bergen, both of Germany

[73] Assignee: Frank Ziech, Bergen, Germany

[21] Appl. No.: 810,161

[22] Filed: Feb. 28, 1997

[30] Foreign Application Priority Data

Mar. 1, 1996 [DE] Germany .................. 196 07 963.2

[51] Int. Cl.$^6$ ............................................ B32B 9/00
[52] U.S. Cl. .................... 428/332; 428/106; 428/212; 428/317.1; 428/402; 424/404; 424/413; 424/421; 264/109; 264/122; 156/60; 156/61; 156/62.2; 156/328; 106/15.05; 106/406
[58] Field of Search ................... 428/332, 402, 428/106, 317.1, 212, 403; 106/15.05, 406; 156/328, 62.2, 61, 60; 264/109, 122, 123; 424/404, 413, 421, 658, 660

[56] References Cited

U.S. PATENT DOCUMENTS

| | | | |
|---|---|---|---|
| 3,930,089 | 12/1975 | Vasishth | 428/12 |
| 4,405,542 | 9/1983 | Greer | 264/109 |
| 4,483,946 | 11/1984 | Barnes et al. | 523/145 |
| 4,562,218 | 12/1985 | Fornadel et al. | 524/15 |
| 4,869,433 | 9/1989 | Lewellin | 241/18 |
| 5,413,746 | 5/1995 | Birjukov | 264/118 |
| 5,416,139 | 5/1995 | Zeiszler | 524/13 |

*Primary Examiner*—William Krynski
*Assistant Examiner*—Abraham Bahta
*Attorney, Agent, or Firm*—Hill & Simpson

[57] ABSTRACT

An insulator material made from rice husks is provided for producing a bulk insulator, characterized by a density in the range from 200 through 250 kg/m$^3$ in the packaged condition. A method for the manufacture of insulator material from rice husks as well as method for producing a bulk insulator from rice husks are also provided.

8 Claims, No Drawings

2

INSULATOR MATERIAL MADE FROM RICE HUSKS FOR PRODUCING A BULK INSULATOR, METHOD FOR THE MANUFACTURE THEREOF AS WELL AS METHOD FOR INSTALLATION THEREOF

FIELD OF THE INVENTION

The present invention is directed to an insulator material made from rice husks for producing a bulk insulator fill, a method for manufacturing said insulation material, as well as a method of insulating a structure using the insulation material of the present invention.

BACKGROUND OF THE INVENTION

Greater quantities of rice husks are produced in rice-producing countries and are becoming serious waste disposal problem. Due to their chemical, biological and physical properties such as, in particular, their naturally low thermal conductivity as well as non-combustibility, rice husks are suitable for recycled use in the building trades. Thus, German Published Applications 3517778 and 3902023 disclose the employment of rice husks for insulating purposes.

Additionally, German Published Application 43 22 907 discloses that heated rice husks, preferably heated to 30° to 60° C., be injected into a hollow space of a building under pressure. An insulating fill of rice husks can thereby be achieved via a blower or the like in this way. Such bulk insulators, however, exhibit the disadvantage that they settle to a greater or lesser extent and thus create void spaces in the insulating layer that represent heat bridges and thus render an insulation less effective.

Accordingly, there is a need for an improved insulating material fabricated from rice husks and an improved method of manufacturing insulating materials from rice husks that will result in a more effective insulation product made from recycled rice husks.

SUMMARY OF THE INVENTION

The present invention is thus based on the object of making an improved insulator material from recycled rice husks, a method for the manufacture of an insulator material from recycled rice husks as well as a method of installing a bulk insulator made from recycled rice husks for a more effective insulation of building walls than previously available building insulation materials made from rice husks.

In the case of an insulator material, the above object is inventively achieved by providing a bulk density in the range from about 120 to about 270 kg/m$^3$ in the packaged condition. The density range is conditioned by, among other things, the rice husk density dependent on the respective rice type.

In the case of the method for manufacturing the insulator material, moreover, this object is achieved by a compressing of rice husks during packaging thereof by a factor ranging from about 1.2 to about 2.5.

In the case of the method for manufacturing a bulk insulator from the insulator material, this object is also achieved by layer-by-layer filling of the unheated insulator material from its packaging condition into a hollow space without pressure and, as required, subsequent compression of the respective layers to a settled apparent density in the range from approximately 100 through 170 kg/m$^3$.

The density of the insulator material preferably is about 220 kg/m$^3$ in the packaged condition.

It can also be provided that the rice husks comprise a fungicide coating.

It can thereby be provided that the fungicide parts lies in the range from 1 to 10 percent by weight.

In a specific embodiment of the invention, it can be provided that the fungicide comprises borax.

In an embodiment, the borax component amounts to about 5 percent by weight of the insulator material.

It can also be provided that the rice husks comprise a hydrophobic or water repellant coating.

Finally, it can be provided that superfine particles are essentially not present in the insulator material.

In the method for manufacturing the insulator material, an application of the fungicide can be performed before the compression step.

In particular, an application of the fungicide can be performed before the compression step with the application of the fungicide ranging from about 1 percent to about 10 percent by weight.

In particular, a fungicide dissolved in a liquid can be provided during the application step.

According to a particular embodiment of the invention, the application of borax dissolved in water can be provided during the application step.

In particular, the application of the borax can be provided in an amount of about 5 percent by weight.

Further, a drying of the rice husks to a normal water content can be provided after the application step.

Further, a hydrophobization of the rice husks can be provided before the drying.

Moreover, a separation of superfine particles can be provided before the compression step.

In particular, a separation by sifting can also be provided.

On the other hand, a separation by wind sifting can be provided.

Further, the separation of superfine particles from the rice husks can be provided before the application step.

The present invention further comprises a method for insulating a structure having a hollow space disposed therein. The method of the present invention comprises the steps of placing a first layer of insulator material into the hollow space without the application of pressure and without effectively heating the insulator material. The insulator material comprises at least partially compressed rice husks having a density ranging from about 120 kg/m$^3$ to about 270 kg/m$^3$ in the packaged condition, or before installation. After the first layer is in place, the method comprises the step of compressing the first layer to an apparent density ranging from about 130 kg/m$^3$ to about 150 kg/m$^3$. After the first layer is in place and has been compressed, the method comprises the steps of providing a subsequent layer on top of the first layer, compressing the subsequent layer and repeating the steps of placing a subsequent layer into the hollow space and compressing the subsequent layer until the hollow space is filled with insulator material.

Other objects and advantages of the present invention will become apparent upon reading the following detailed description and appended claims.

DETAILED DESCRIPTION OF THE PRESENTLY PREFERRED EMBODIMENTS

The invention is based on the surprising perception that a settling of the bulk insulators manufactured from the insulator material is avoided by a compression of the rice husks during packaging. An expansion of the rice husks could even be observed in trials. The resulting bulk insulator fills thus comprise no void spaces and, thus, no heat bridges that render the insulation ineffective. Over and above this, the insulator material can be produced with little apparatus-related expenditures and, according to a particular embodiment of the invention, exhibits good protection against fungus attack. The inventive bulk insulator can be produced from the inventive insulator material in a simple way, i.e. particularly without heating of the rice husks before being filled as well as without applying pressure, for example in the form of a blower.

Further features and advantages of the invention derive from the claims and from the following description in which an exemplary embodiment is explained in detail.

According to a particular embodiment of the inventive method for manufacturing the inventive insulator material, superfine particles are separated by wind sifting from loose rice husks produced when dehusking and peeling rice grains that have been collected and stored and, potentially, accommodated in an intermediate hopper. As a result thereof, a higher air pore content is achieved in the bulk insulator manufactured later from the inventive insulator material. Since, additionally, superfine constituents of clay and the like are also eliminated, it is also assured that vermin no longer attack the otherwise inedible and indigestible rice husks.

Subsequently, the rice husks are treated with a fungicide in the form of borax having a weight part of about 5%. Fungus attack is thereby avoided, this, in particular, not being precluded given employment of rice husks in roof slopes that represent a warm and potentially damp environment, especially in summer. Over and above this, borax also exhibits an additional fire-retardant effect.

A hydrophobization or addition of a water repellant of the rice husks is subsequently undertaken. This is necessary for meeting the demands of approval as a building material. Many water repellants known to those skilled in the art may be used for this purpose. Since borax is applied to the rice husks dissolved in water, a drying of the rice husks must follow that in turn dries the rice husks to a normal water content. It is to be pointed out here that the moisture of the rice husks is dependent on the relative atmospheric humidity.

The last step of the method comprises a compression of the rice husks during packaging with a factor of about 1.7, so that the apparent weight of the rice husks increases from about 130 kg/m$^3$ in the loose condition to approximately 220 kg/m$^3$ in the compressed condition. This prevents the rice husks from settling in the bulk insulator manufactured therefrom.

At a building site, subsequently, the insulator material is filled from the packaging into a hollow space of a building without heating the rice husks and without pressure, and is also after-compressed in layers, so that the apparent density lies at 130 through 150 kg/m$^3$. The result is a loose bulk fill in a standing, rigid wall. The bulk insulator can be employed in the region of house walls as core insulation, roof insulation and bulk fill under a (floor) pavement. Over and above this, it can also be employed as insulating material in boiler manufacture (hot water boiler or store and heating boilers).

The manufacture of the inventive insulator material from rice husks as well as the manufacture of the bulk insulator from the inventive insulator material requires a relatively inexpensive process technology, so that the primary cost for the production of a bulk insulator fill—despite the long shipping routes for the rice husks—lies in the area of " Öko" insulators that are beneficial in terms of energy efficiency.

From the above description, it is apparent that the objects of the present invention have been achieved. While only certain embodiments and methods have been set forth, alternative embodiments and methods and various modifications will be apparent from the above description to those skilled in the art. These and other alternatives are considered equivalents and within the spirit and scope of the present invention.

What is claimed is:

1. An insulator material for the production of a bulk insulator, the insulator material comprising:

at least partially compressed rice husks having a density ranging from about 120 kg/m$^3$ to about 270 kg/m$^3$ in a packed but loose condition.

2. The insulator material of claim 1 wherein the density is about 220 kg/m$^3$.

3. The insulator material of claim 1 wherein the rice husks comprise a fungicide coating.

4. The insulator material of claim 1 wherein the rice husks further comprise from about 1 % to about 10% percent by weight of a fungicide coating.

5. The insulator material of claim 1 wherein the rice husks comprise a fungicide coating comprising borax.

6. The insulator material of claim 1 wherein the rice husks further comprise from about 1 % to about 10% percent by weight borax.

7. The insulator material of claim 1 wherein the rice husks further comprise a hydrophobic coating.

8. The insulator material of claim 1 wherein the rice husks are further characterized as being substantially free of fine clay particles.

* * * * *